Figure 1:
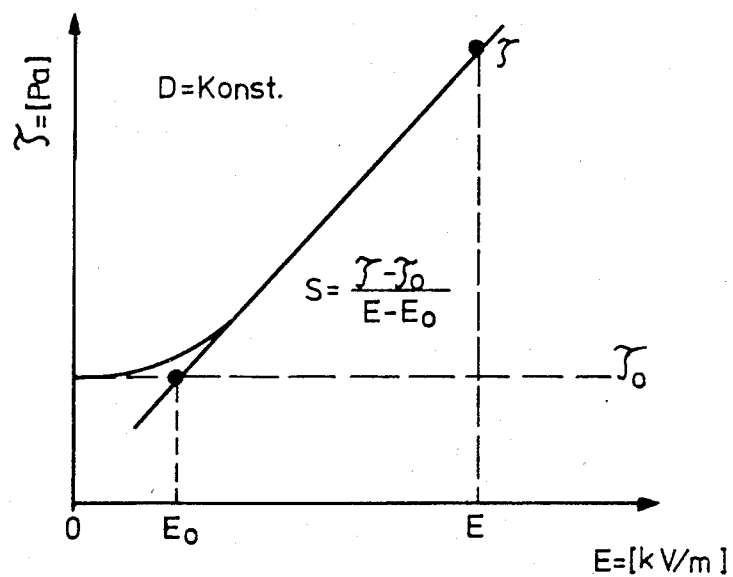

United States Patent [19]

Goossens et al.

[11] Patent Number: 4,645,614

[45] Date of Patent: Feb. 24, 1987

[54] ELECTROVISCOUS LIQUIDS

[75] Inventors: John Goossens, Cologne; Günter Oppermann, Leverkusen; Wolfgang Grape, Cologne; Volker Härtel, Germering, all of Fed. Rep. of Germany

[73] Assignees: Bayer Aktiengesellschaft, Leverkusen; Metzeler Kautschuk GmbH, Munich, both of Fed. Rep. of Germany

[21] Appl. No.: 753,216

[22] Filed: Jul. 9, 1985

[30] Foreign Application Priority Data

Jul. 26, 1984 [DE] Fed. Rep. of Germany ....... 3427499

[51] Int. Cl.$^4$ .............................................. C09K 3/00
[52] U.S. Cl. .................................... 252/75; 252/78.3; 252/174.15; 252/309; 252/357; 252/363.5; 252/573; 528/38; 528/41; 528/28; 556/425; 556/442
[58] Field of Search ........... 252/75, 78.3, 573, 174.15, 252/309, 351, 357, 363.5; 528/38, 41, 28; 556/425, 442

[56] References Cited

U.S. PATENT DOCUMENTS

| | | | |
|---|---|---|---|
| 2,928,858 | 3/1960 | Morehouse | 252/351 |
| 3,047,507 | 7/1962 | Winslow | 252/74 |
| 3,970,573 | 7/1976 | Westhaver | 252/74 |
| 3,984,339 | 10/1976 | Takeo et al. | 252/74 |
| 4,033,892 | 7/1977 | Stangroom | 252/75 |

FOREIGN PATENT DOCUMENTS 2500020 7/1976 Fed. Rep. of Germany ...... 556/425

*Primary Examiner*—Robert A. Wax
*Attorney, Agent, or Firm*—Sprung, Horn, Kramer & Woods

[57] ABSTRACT

The electroviscous suspension is based on a mixture of aqueous silica gel with silicone oil as the liquid phase to which a dispersant is added. The dispersant consists of amino functional or silicon-functional polysiloxanes having a molecular weight above 800. The concentration of the dispersant is from 1 to 30% by weight and preferably from 5 to 20% by weight, based on the silica gel particles. Electroviscous suspensions such as these are distinguished by the fact that they are highly compatible with elastomeric materials, non-sedimenting, non-inflammable and physiologically acceptable. In addition, they are heat- and freeze-resistant over a wide temperature range and are largely unaffected by temperature and pressure in their viscosity.

17 Claims, 2 Drawing Figures

ELECTROVISCOUS LIQUIDS

The present invention relates to electroviscous suspensions containing more than 25% by weight of silica gel with a water content of from 1 to 15% by weight as the disperse phase and silicone oil as the liquid phase and also a dispersant.

Electroviscous liquids (EVL) are dispersions of finely divided hydrophilic solids in hydrophobic, electrically non-conductive oils of which the viscosity may be increased very quickly and reversibly from the liquid to the plastic or solid state under the effect of a sufficiently strong electrical field. Electrical DC fields and also AC fields may be used for changing the viscosity, the currents flowing through the EVL being extremely low. Accordingly, EVL's may be used for any applications in which it is desired to control the transmission of powerful forces by low electric power levels, for example into clutches, hydraulic valves, shock absorbers, vibrators or systems for positioning and holding workpieces in position. In a number of components based on EVL's, the EVL comes directly in contact with elastomeric materials. It has been found that most of the EVL's described in the literature are not suitable for those components, because they contain oils or solvents which attack or swell and, in some cases, even dissolve elastomeric materials. Another requirement encountered in practice is that the EVL should be liquid and chemically stable over a temperature range of approx. $-50°$ C. to $150°$ C. and should show an adequate electroviscous effect, at least at temperatures of from $-30°$ C. to $110°$ C. Finally, the EVL is also required to remain stable over a long period, i.e, should not undergo phase separation and, in particular, should not form any sediment which is difficult to redisperse.

EVL's based on silica gel/silicone oil are described in U.S. Pat. No. 3,047,507. The dispersants used in this case, such as for example sorbitan sesquioleate, and also other surfactants, lead almost always to EVL's which show inadequate electroreactivity and excessive electrical conductivity, especially at relatively high temperatures. If conductivity is too high, excessively high currents and hence excessively high electric power levels are required to activate the EVL or sufficiently powerful electrical fields cannot be generated in the EVL.

Now, the object of the present invention is to develop EVL's which show high electroreactivity and low electrical conductivity, even at high temperatures (up to $110°$ C.).

Starting out from an electroviscous suspension based on silica gel and silicone oil, the invention achieves this object by the addition of a dispersant consisting of amino functional, hydroxy functional, acetoxy functional or alkoxy functional polysiloxanes having a molecular weight above 800. These polysiloxanes are added in a concentration of from 1 to 30% by weight and preferably in a concentration of from 5 to 20% by weight, based on the silica gel particles.

The amino functional polysiloxanes used as dispersants preferably correspond to the following general formula

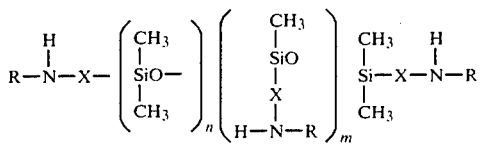

in which
$10 < n < 1000$,
$m = 0$ to 5,
$R = H$ or $C_1$-$C_8$ alkyl and
X is a difunctional radical consisting of C, H and, optionally, O and/or N.

The amino groups are attached to the silicone either by an SiC bond or by an SiOC bond. If the desired bond is an SiC-bond, X represents a difunctional hydrocarbon radical containing from 1 to 6 and preferably from 1 to 3 carbon atoms. Preferred amino functional radicals are the aminomethyl and γ-aminopropyl groups. In addition to C and H, the difunctional radical X may also contain N. For example, X may represent the group $CH_2$—$CH_2$—$CH_2$—$NH$—$CH_2$—$CH_2$—$NH_2$. If the desired bond is an SiOC-bond, the amino functional radical

is an aminoalkoxy group. In the interests of hydrolysis stability, a secondary SiOC-linkage is preferred. The 1-amino-2-propoxy radical

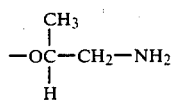

or the 1-amino-3-butoxy radical

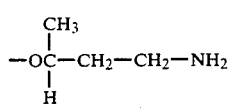

is particularly suitable in this respect.

Instead of amino functional polysiloxanes, silicon-functional polysiloxanes corresponding to the general formula

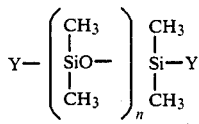

in which
$10 < n < 1000$ and
Y is a hydrolyzable group, preferably a hydroxy, alkoxy or carboxy group,
may also be used as the dispersant.

The above-mentioned functional polysiloxanes suitable for use as the dispersant preferably contain from 20 to 300 dimethyl siloxane units. These dimethyl siloxane units provide in particular for the preparation of dispersions combining a high solids content with a reasonable intrinsic viscosity.

The following advantages are afforded by the invention:

The EVL's according to the invention surprisingly show both high electroreactivity and also low electrical conductivity only slightly affected by temperature.

In addition, they are highly compatible with elastomeric materials, especially rubber, non-sedimenting and physiologically inert (nontoxic). In addition, they are heat- and freeze-resistant over an extremely wide temperature range and are substantially unaffected by temperature and pressure in their viscosity. In addition, the electroviscous suspensions according to the invention show favorable dielectric properties affected only slightly by temperature and frequency and also high dielectric strength. Another advantage of the EVL's according to the invention is that they are relatively easy and therefore inexpensive to produce and that commercial products may be used as starting materials.

Figure 2:
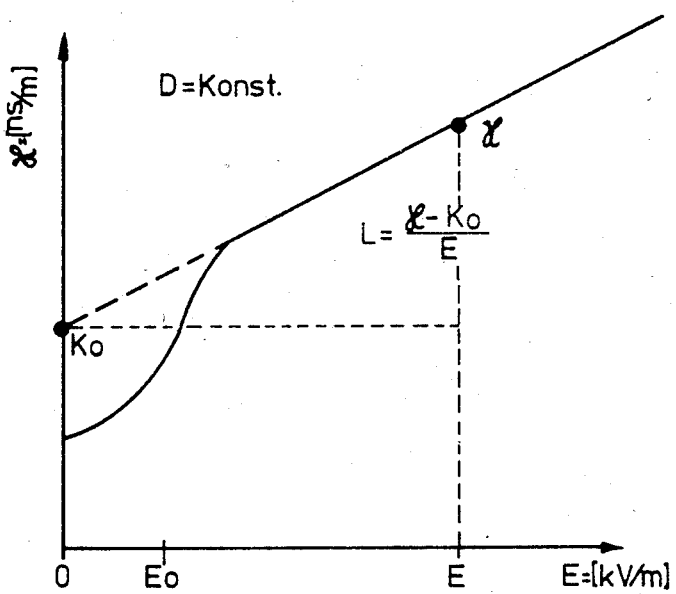

The invention is illustrated by the following Examples in conjunction with graphs and a Table, of which:

FIG. 1 shows the dependence of the shearing force measured in the EVL as a function of the electrical field strength at a constant shear velocity, FIG. 2 shows the electrical conductivity of the EVL as a function of the field strength at a constant shear velocity and the Table shows the characteristic data of the EVL's according to the invention by comparison with the prior art. The process steps involved in the production of the EVL's, the chemical process for producing the dispersants, the measuring technique required for monitoring the desired physical properties and also typical examples of the EVL's according to the invention are described in the following.

Commercial silica gels may be used for producing the EVL's. The moisture content of the silica gel may be increased or reduced as required. In the preparation of the dispersions, the silicone oil and all or part of the dispersant may be initially introduced and the silica gel introduced into the silicone oil with continuous stirring. The silica gel may be rapidly introduced to begin with, being added more slowly towards the end as the viscosity increases. If only part of the dispersant is introduced to begin with, the rest of the dispersant is introduced during the addition of the silica gel. However, the end properties of the EVL are not critically affected by the process used for its production or by the type of mixing used for dispersion. For example, ordinary stirrers, ball mills or ultrasound may be used for dispersion. However, the dispersions can generally be prepared more quickly by intensive mixing and are also somewhat finer in that case.

The quantity of dispersant required depends largely on the specific surface of the silica gel used. In approximate terms, about 1 to 4 mg/m$^2$ of silica gel are required. However, the precise quantity required also depends upon the type of silica gel used and upon the type of dispersant used.

Commercial silica gels are, for example, Ultrasil, Durosil, Extrusil (Degussa) and Vulkasil, Silikasil and Baysikal (Bayer). The silica gels used do not have to be pure SiO$_2$ and may readily contain up to 20% by weight of Al$_2$O$_3$, Na$_2$O and CaO. In addition, a few percent by weight of SO$_3$, Cl and Fe$_2$O$_3$ may often be present. The ignition loss, i.e. the weight loss at 1000° C., is generally between 10 and 15% by weight, of which on average about 6% by weight is moisture which is equivalent to the weight loss determined by drying at 105° C. The specific surface, as measured by the BET method, is generally between 20 and 200 m$^2$/g, but is not critical and may readily be slightly smaller or larger. However, if the specific surface is too small, the dispersions formed are undesirably coarse, whereas an excessively high specific surface can lead to an excessive dispersant demand.

Silicone oils suitable for use as the dispersion medium are polydimethyl siloxanes and polymeric methylphenyl siloxanes. Suitable oils have a viscosity at room temperature of from about 3 to 300 mm$^2$/s. In general, however, the low-viscosity oils (3 to 20 mm$^2$/s) are preferred, because a lower intrinsic viscosity of the EVL is obtained in this way, so that substantial changes in viscosity can be obtained by means of the electroviscous effect.

The production of the amino modified polysiloxanes used as dispersant is known in principle to the expert, but varies according to the type of linkage required. Compounds corresponding to the following formula

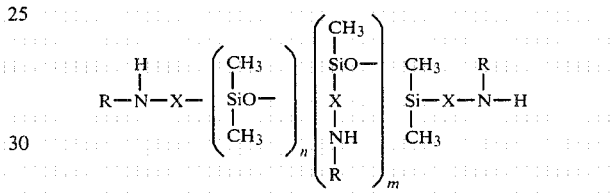

in which n and m are as defined above and X=CH$_2$, are produced from the corresponding halogen derivatives (Cl or Br) and the corresponding amine in accordance with the following scheme:

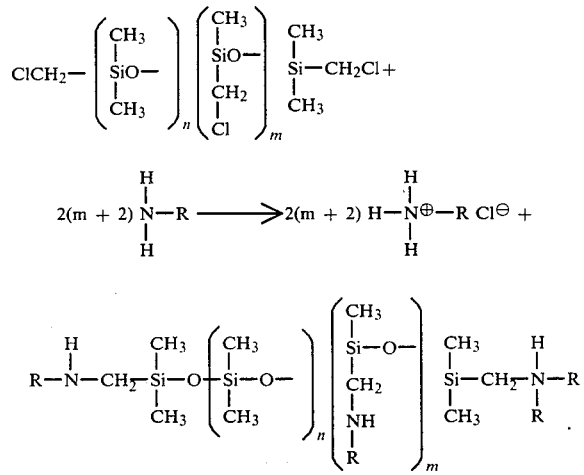

The Cl-containing compound is produced by co-hydrolysis of desired quantities of ClCH$_2$(CH$_3$)$_2$SiCl, ClCH$_2$(CH$_3$)SiCl$_2$ and (CH$_3$)$_2$SiCl$_2$. Br may of course be used instead of Cl.

Compounds of the above-mentioned type, in which X is a C$_2$-C$_3$ alkyl radical, may be produced for example by the platinum-catalyzed addition of a suitable olefin onto SiH-containing compounds. Thus, allyl chloride for example reacts with a silicone oil corresponding to the formula

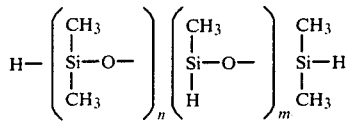

to form a γ-chlorofunctional silicone oil which may be reacted similarly to the reaction described above for X=CH₂ to form the desired amino function oil. Alternative methods are also known in principle to the expert.

Compounds of the above-mentioned dispersant type, in which X is an aminoalkoxy group, may be produced by reacting silicon-functional oils containing, for example, SiCl, SiOCH₂H₅,

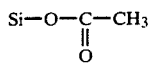

or SiH groups with amino alkanols, optionally in the presence of suitable catalysts. 1-propanolamine is particularly suitable for this purpose. In the case of the aminoalkoxy functional systems, m may (advantageously) assume the value O. A particularly suitable dispersant is an aminoalkoxy functional polysiloxane corresponding to the following formula

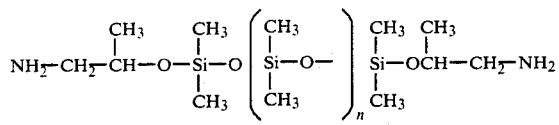

in which n may assume a value of from 15 to 100 and preferably from 30 to 70.

It is also possible first to prepare the silane

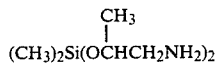

and then to build up the chain by a base-catalyzed equilibration reaction in the presence of octamethyl cyclotetrasiloxane.

The EVL's thus produced were studied in a modified rotational viscosimeter, of the type described by W. M. Winslow in J. Appl. Phys. 20 (1949), pages 1137–1140. The electrode surface of the inner rotating cylinder 50 mm in diameter is approx. 78 cm² and the gap width between the electrodes 0.58 mm. For the dynamic measurements, the shear load may be adjusted to a maximum of 2330 s⁻¹. The measuring range of the viscosimeter for the shearing force is at most 750 Pa. Both static and dynamic measurements are possible. The EVL may be activated both by DC voltage and by AC voltage.

Where DC voltage is used, it may happen with certain liquids that, in addition to the spontaneous increase in viscosity or in the flow limit when the field is switched on, the solid particles are also slowly deposited onto the electrode surfaces, falsifying the result of measurement, especially at low shear velocities or in the case of static measurements. Accordingly, testing of the EVL is preferably carried out with AC voltage and under dynamic shear stress. Readily reproducible flow curves are obtained in this way.

To determine electroreactivity, a constant shear velocity $<O\ D<2330\ s^{-1}$ is adjusted and the shearing force τ measured as a function of the electrical field strength E. With the test apparatus, it is possible to generate alternating fields up to a maximum effective field strength of 2370 KV/m for a maximum effective current of 4 mA and a frequency of 50 Hz. The flow curves obtained are as shown in FIG. 1. It can be seen that the shearing force τ shows a parabolic increase at low field strengths and a linear increase at higher field strengths. The gradient S of the linear part of the curve is apparent from FIG. 1 and is expressed in kPa.m/kV. The threshold value $E_O$ of the electrical field strength is determined from the point of intersection between the straight line S and the straight line $τ=τ_O$ (shearing force without an electrical field) and is expressed in kV/m. The increase in the shearing force $τ(E)−τ_O$ in the electrical field $E>E_O$ may be calculated in accordance with the following equation:

$$τ(E)−τ_O=S(E−E_O).$$

The measurements may be repeated at various shear velocities D. The values determined for $E_O$ and S are generally scattered over a range of approx. +5% to ±20% around the average value.

The electrical conductivity is determined from the effective current density I and the effective field strength E. At a constant shear velocity D, the conductivity increases linearly with the electrical field strength at relatively high field strengths $E>E_O$ (see FIG. 2). FIG. 2 shows the increase L in the electrical conductivity with the field strength E in nS/kV and the intersection $K_O$ of the straight line L with the ordinate (E=O) in nS/m. $K_O$ may also assume negative values. For $E>E_O$, the conductivity may thus be calculated in accordance with the following equation:

$$(E)=L·E+K_O.$$

In the following Examples, formulations 1 to 4 correspond to the prior art. Examples 5 to 10 are the EVL's according to the invention.

EXAMPLES

Silica gel:
  approx. 80% by weight SiO₂
  approx. 6% by weight CaO
  approx. 3% by weight Na₂O
  <0.4% by weight Al₂O₃
  Ignition loss according to DIN 55921/2: approx. 7% by weight.
  Drying loss according to DIN 55921/2: approx. 6% by weight.
  BET surface: approx. 35 m²/g.
Silicone oil: Polydimethyl siloxane
  Viscosity at 25° C.: 5 mm²S⁻¹.
  Density at 25° C.: 0.9 g/cm³.
  Dielectric constant Er according to DIN 53483 at 0° C. and 50 Hz: 2.8.
  Loss factor tan δ according to DIN 53483 at 0° C. and 50 Hz: 2.10⁻⁴.

EXAMPLES

Silica gel:
  approx. 80% by weight SiO₂
  approx. 6% by weight CaO
  approx. 3% by weight Na₂O <0.4% by weight $Al_2O_3$
Ignition loss according to DIN 55921/2: approx. 7% by weight.
Drying loss according to DIN 55921/2: approx. 6% by weight.
BET surface: approx. 35 m²/g.
Silicone oil: Polydimethyl siloxane
  Viscosity at 25° C.: 5 mm²S⁻¹.
  Density at 25° C.: 0.9 g/cm³.
  Dielectric constant Er according to DIN 53483 at 0° C. and 50 Hz: 2.8.
  Loss factor tan δ according to DIN 53483 at 0° C. and 50 Hz: $2.10^{-4}$.

EXAMPLE 1
40 parts by weight of silica gel 1
60 parts by weight of silicone oil
4 parts by weight of sorbitan monooleate

EXAMPLE 2
40 parts by weight of silica gel 1
60 parts by weight of silicone oil
4 parts by weight of sorbitan sesquioleate

EXAMPLE 3
40 parts by weight of silica gel 1
60 parts by weight of silicone oil
4 parts by weight of glycerol mono- and dioleate (Atmos 300)

EXAMPLE 4
40 parts by weight of silica gel 1
60 parts by weight of silicone oil
6 parts by weight of 2-heptadecenyl-4-ethyl-2-oxazoline-4-methanol

EXAMPLE 5
40 parts by weight of silica gel 1
60 parts by weight of silicone oil
2 parts by weight of $M'_2D_{16}$

EXAMPLE 6
40 parts by weight of silica gel 1
60 parts by weight of silicone oil
4 parts by weight of $M''_2D_{28}$

EXAMPLE 7
40 parts by weight of silica gel 1
60 parts by weight of silicone oil
2 parts by weight of $M'_2D'_2D_{69}$

EXAMPLE 8
50 parts by weight of silica gel 1
50 parts by weight of silicone oil
2.5 parts by weight of $M'_2D_{120}$

EXAMPLE 9
40 parts by weight of silica gel 1
60 parts by weight of silicone oil
4 parts by weight of $HO—D_{200}—H$

EXAMPLE 10
40 parts by weight of silica gel 1
60 parts by weight of silicone oil
4 parts by weight of

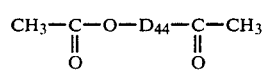

with

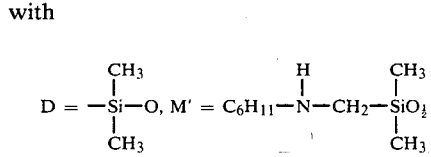

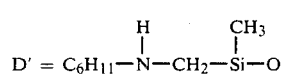

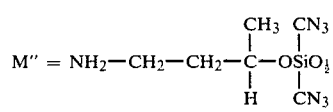

| Example No. | Dynamic electroviscous effect | | | | AC conductivity | | | |
|---|---|---|---|---|---|---|---|---|
| | 25° C. | | 90° C. | | 25° C. | | 90° C. | |
| | Eo[kV/m] | S[Pa.m/kV] × 10⁻³ | Eo[kV/m] | S[Pa.m/kV] × 10⁻³ | Ko[nS/m] | L[nS/kV] × 10⁻³ | Ko[nS/m] | L[nS/kV] × 10⁻³ |
| 1 | 587 | 561 | 172 | 177 | 46 | 6 | −32 | 2256 |
| 2 | 783 | 472 | 232 | 273 | 43 | 4 | −96 | 1373 |
| 3 | 119 | 259 | measurement not possible | | 1027 | 1840 | measurement not possible | |
| 4 | 747 | 289 | 319 | 228 | 32 | 5 | 16 | 520 |
| 5 | 480 | 419 | 419 | 394 | 41 | 5 | 1 | 150 |
| 6 | 557 | 390 | 433 | 548 | 32 | 2 | 20 | 110 |
| 7 | 574 | 389 | 433 | 608 | 35 | 1 | 107 | 20 |
| 8 | 689 | 537 | 271 | 786 | 38 | 4 | 141 | 37 |
| 9 | 726 | 427 | 468 | 569 | 36 | 3 | 28 | 51 |
| 10 | 704 | 441 | 443 | 646 | 35 | 3 | 59 | 58 |

We claim:
1. An electroviscous suspension comprising more than 25% by weight of silica gel with a water content of from 1 to 15% by weight as the disperse phase and silicone oil as the liquid phase and also a dispersant, wherein the dispersant comprises a functional polysiloxane selected from the group consisting of an amino functional polysiloxane, a hydroxy functional polysiloxane, an acetoxy functional polysiloxane and an alkoxy functional polysiloxane, said polysiloxane having a molecular weight above 800.

2. An electroviscous suspension as claimed in claim 1, wherein the functional polysiloxane is added in a concentration of from 1 to 30% by weight, based on the silica gel.

3. An electroviscous suspension as claimed in claim 1 wherein the amino functional polysiloxane has the following formula:

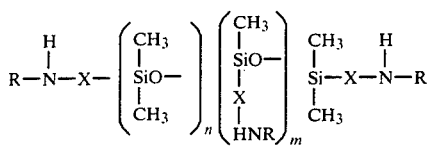

in which
10 < n < 1000,
m = 0 to 5,
R = H or $C_1$-$C_8$ alkyl and
X is a difunctional hydrocarbon radical.

4. An electroviscous suspension wherein the amino functional polysiloxane has the following formula:

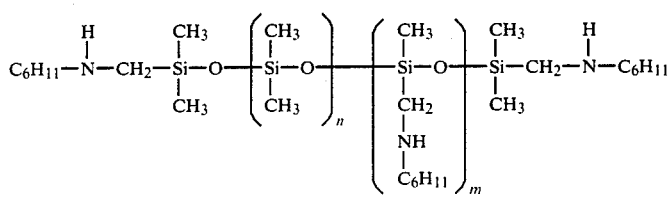

with
m = 0 to 3 and
10 < n < 1000.

5. An electroviscous suspension as claimed in claim 1 wherein the functional polysiloxane has the following formula

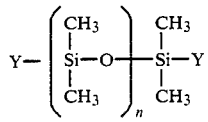

in which
10 < n < 1000 and
Y is hydrolyzable group selected from the group consisting of a hydroxy group, an alkoxy group and a carboxy group.

6. An electroviscous suspension as claimed in claim 1, wherein the functional polysiloxane is added in a concentration of from 5 to 20% by weight, based on the silica gel.

7. An electroviscous suspension as claimed in claim 3, wherein X is a difunctional hydrocarbon radical containing 1 to 6 carbon atoms.

8. An electroviscous suspension as claimed in claim 3, wherein X is a difunctional hydrocarbon radical containing one or more N atoms.

9. An electroviscous suspension as claimed in claim 3, wherein X is a difunctional hydrocarbon radical containing one or more O atoms.

10. An electroviscous suspension as claimed in claim 3, wherein X is a difunctional hydrocarbon radical containing one or more N atoms and one or more O atoms.

11. An electroviscous suspension as claimed in claim 3, wherein X is a difunctional hydrocarbon radical selected from the group consisting of $CH_2$—$CH_2$—$CH_2$—$NH$—$CH_2$—$CH_2$,

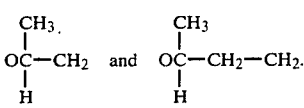

12. An electroviscous suspension as claimed in claim 5, wherein the functional polysiloxane contains 20 to 300 dimethyl siloxane units.

13. An electroviscous suspension as claimed in claim 1, wherein the silicone oil is selected from the group consisting of polydimethyl siloxane and polymeric methylphenyl siloxane.

14. An electroviscous suspension as claimed in claim 1, wherein the silicone oil has a viscosity at room temperature of 3 to 300 mm²/s.

15. An electroviscous suspension as claimed in claim 1, wherein the silicone oil has a viscosity at room temperature of 3 to 10 mm²/s.

16. An electroviscous suspension as claimed in claim 1, wherein the amino functional polysiloxane has the following formula

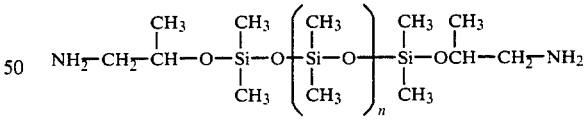

wherein n is 15 to 100.

17. An electroviscous suspension as claimed in claim 16, wherein n is 30 to 70.

* * * * *